3,278,580
ETHER-ALCOHOL CONTAINING ESTERS OF POLYHALO-BICYCLOHEPTENE DICARBOXYLIC ACIDS

Michael Worsley, Clyde, Alberta, Canada, and Raymond R. Hindersinn, Lewiston, N.Y., assignors to Hooker Chemical Corporation, Niagara Falls, N.Y., a corporation of New York
No Drawing. Filed Aug. 15, 1963, Ser. No. 302,439
4 Claims. (Cl. 260—468)

This application is a continuation-in-part of our copending application Serial Number 25,520, filed April 29, 1960, now abandoned, which is a continuation-in-part of copending application Serial Number 853,689, now U.S. Patent 3,055,850.

This invention relates to novel resinous compositions and method for preparing same. More particularly, the present invention resides in polyurethane compositions useful for many applications, for example, in the preparation of flame retardant rigid and flexible polyurethane foams, flame retardant polyurethane surface coatings, flame retardant polyurethane elastomers or synthetic rubbers, flame retardant adhesives, and the like. The resinous compositions of the invention are also useful in the preparation of polyester resins, particularly unsaturated polyester resins. Other uses include the preparation of plasticizers.

The methods of the prior art have attained fire-resistance in rigid foams by the use of various plasticizing substances, such as the various phosphate or phosphonate esters or chlorinated compounds. However, such plasticizing substances are additives which are not chemically combined with the polyurethane plastic and are progressively lost from the plastic by evaporation, leaching, and the like. Consequently, the product does not have a permanently reduced flammability. Furthermore, the plasticizing additive affects the physical properties of the product. Alternatively, the art has incorporated chlorine containing compounds into the resultant product, for example, Serial Number 623,795, "Fire Resistant Foams," filed November 23, 1956, now abandoned, but refiled as Serial Number 311,225, now U.S. Patent 3,156,659, which incorporates an adduct of hexachlorocyclopentadiene. Although this method overcomes the disadvantages inherent in the use of plasticizing substances, it has been found that the incorporation of the chlorine containing compound into the polyester causes a rapid increase in viscosity, and solid compositions usually result at a chlorine content greater than fifteen percent, therefore requiring special handling or other procedures to obtain a polyurethane foam of high chlorine content.

Most flexible polyurethane foams are claimed to be fire resistant per se and therefore, very little has been done to increase the fire resistance of these materials. The claimed fire resistance, however, usually is based on the fact that such materials are self-extinguishing when the foams are ignited by virtue of the fact that the burning elastomeric material melts and falls away from the article thus extinguishing the flame. The melt, however, is flammable and will burn if ignited.

It is therefore, an object of the present invention to provide resinous compositions which overcome the aforementioned disadvantages of the prior art. It is a further object of the present invention to provide resinous compositions having a high halogen content which are useful for many purposes, including the preparation of flame-retardant polyurethane foams, adhesives, coating compositions and elastomers, which compositions are liquid at room temperature and thereby can be handled by conventional metering and pumping equipment. It is a further object of the present invention to provide resinous compositions which can be easily and inexpensively prepared, and which can be used to easily and inexpensively prepare products having excellent physical characteristics. It is a still further object of the present invention to provide foamable compositions which can be easily and rapidly varied so as to provide permanently fire resistant polyurethane foams with a wide range of physical properties, ranging from rigid foams to semi-rigid foams to those flexible foams suitable for cushioning materials and the like. An additional object of the present invention is to prepare truly fire resistant polymers and polymeric materials, and also truly fire resistant polyurethane foams in both the solid and molten state. Further objects and advantages of the present invention will appear hereinafter.

In accordance with the present invention, it has been found that high halogen-containing, resinous compositions which are liquid at room temperature and which accomplish the foregoing objectives of the present invention can be prepared by reacting together (A) one mole of a dicarboxylic acid adduct of hexahalocyclopentadiene and a dicarboxylic compound containing aliphatic carbon to carbon unsaturation, and (B) at least four moles of a monomeric 1,2-epoxide.

The resulting compositions have the following formula:

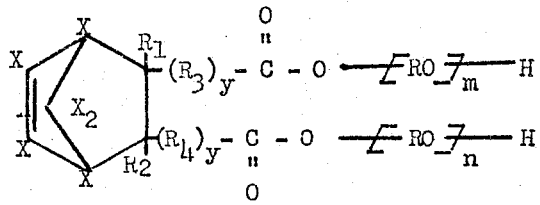

wherein X is a halogen selected from the group consisting of fluorine, chlorine, bromine, and mixtures thereof, R is a residue of a monomeric 1,2-epoxide, $R_1$ and $R_2$ are hydrogen or alkyl radicals having 1 to 4 carbon atoms, $R_3$ and $R_4$ are hydrocarbon radicals having 1 to 6 carbon atoms, $y$ is an integer from 0 to 1, and $m$ and $n$ are integers from 1 to 10, wherein $m+n$ is at least 4. Usually $m$ and $n$ are at least 2. Where lower viscosity products are desired, the values of $m$ and $n$ should be at least 3, and more preferably at least 4. Where higher halogen-content products are desired, the values of $m$ and $n$ should not exceed about 6. $R_1$ and $R_2$ are preferably hydrogen or methyl, but can be ethyl, propyl or butyl or combinations thereof. $R_3$ and $R_4$ can be straight chain or branched chain alkyl such as methyl, ethyl, propyl, isopropyl, and the like; alkenyl wherein the unsaturation occurs in either the main chain or a branched chain; as well as combinations of these.

The preferred dicarboxylic acid adduct of hexahalocyclopentadiene is 1,4,5,6,7,7-hexachlorobicyclo-(2.2.1)-5-heptene-2,3-dicarboxylic acid (commonly called chlorendic acid) because it is readily available commercially. Others that can be employed include 1,4,5,6,7,7-hexabromobicyclo - (2.2.1) - 5 - heptene - 2,3 - dicarboxylic acid; 1,4,5,6,7,7 - hexachloro - 2 - methylbicyclo - (2.2.1) - 5 - heptene - 2,3 - dicarboxylic acid; 1,4,5,6 - tetrachloro-7,7 - difluorobicyclo - (2.2.1) - 5 - heptene - 2,3 - dicarboxylic acid; 1,4,5,6,7,7 - hexachlorobicyclo - (2.2.1) - 5-heptene-2-acetic-2-carboxylic acid. The halogen in hexahalocyclopentadiene is selected from the group consisting of chlorine, bromine, fluorine, and mixtures thereof. Typical dicarboxylic compounds containing aliphatic carbon to carbon unsaturation which can be used in preparing the dicarboxylic acid adduct include maleic, fumaric, itaconic, citraconic, as well as longer chain compounds such as 3.7-decadienedioic acid, 2-vinyl-5-octenedioic acid, and 2,5-divinylhexanedioic acid. The acid halides, acid esters or acid anhydrides can be used in preparing the dicarboxylic acid adduct, with the acid anhydrides being preferred.

Examples of monomeric 1,2-epoxides include the alkylene oxides having 2 to 6 carbon atoms such as ethylene oxide, propylene oxide, butylene oxide, isobutylene oxide, and 2,3-epoxyhexane. Additional examples are 3-ethyl-2,3-epoxyoctane, epichlorohydrin, epibromohydrin, styrene oxide, glycidol, decylene oxide, triphenyl glycidyl silane, allyl glycidyl ether, methyl glycidyl ether, phenyl glycidyl ether, butyl glycidyl sulfide, glycidyl methyl sulfone, glycidyl methacrylate, glycidyl acrylate, glycidyl benzoate, glycidyl acetate, glycidyl octanoate, glycidyl sorbate, glycidyl allyl phthalate, phenyl-(p-octadecycloxybenzoyl) ethylene oxide,

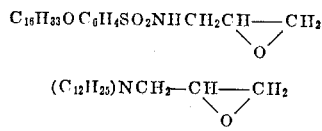

and the like. The preferred monoepoxides are the monoepoxide substituted hydrocarbons, the monoepoxy-substituted ethers, sulfides, sulfones and esters wherein the said compounds contain no more than eighteen carbon atoms. A lower alkylene oxide is preferably employed in rigid foams, as the higher counterparts yield flexible rather than rigid foams.

In the preparation of the resinous reaction product of the present invention, the ratios employed are one mole of hexahalocyclopentadiene adduct to at least four moles of 1,2-epoxide, and preferably not more than thirty moles of 1,2-epoxide. After the hexahalocyclopentadiene adduct and the 1,2-epoxide are mixed together, the reaction product is heated at a temperature preferably from about fifty to 150 degrees centigrade for preferably from one to 24 hours. The reaction time can be shortened and the temperatures can be lowered by the use of moderate pressure, preferably about 30 to 60 pounds per square inch absolute instead of atmospheric, although higher pressures such as up to 500 pounds per square inch absolute can be used, if desired. The reaction is also facilitated by the use of catalysts, although these are not necessary for the reaction to proceed. Suitable catalysts are compounds such as stannous octoate, stannous chloride, and the alkali metal hydroxides, such as the hydroxides of lithium, sodium, rubidium and cesium. Other catalysts that have been used include calcium and barium carbonate, dibutyltin dilaurate and triethylene diamine.

It is also contemplated in the present invention to prepare compositions utilizing a mixture of 1,2-epoxides. A mixture, such as ethylene oxide and propylene oxide, can be reacted with the bicyclic adduct throughout the reaction period. Alternatively, one epoxide, such as propylene oxide, can be reacted during the early stage of the reaction period and a second epoxide such as ethylene oxide, can be introduced to the reaction mixture at a later stage.

Small amounts of by-product that form, probably condensed epoxides, do not adversely affect the characteristics of the product of the invention.

The resinous reaction products of the present invention are especially useful in the preparation of polyurethane foams. The polyurethane foams can be prepared by reacting together the resinous reaction product of the present invention and an organic polyisocyanate in the presence of a foaming agent and optionally a supplementary hydroxyl-containing polymer and a reaction catalyst, and other additives, if desired.

The polyisocyanate concentration can be varied from about 75 to 125 percent isocyanato groups with respect to the total number of hydroxyl and carboxyl groups in the resinous reaction product, the hydroxyl-containing polymer, and the foaming agent.

Aromatic isocyanates are preferred because they are more reactive and less toxic than the aliphatic members. Typical isocyanates include the following: 2,4-tolylene diisocyanate; 2,6 - tolylene diisocyanate; hexamethylene diisocyanate; ethylene diisocyanate; trimethylene diisocyanate; pentamethylene diisocyanate; 1,2-propylene diisocyanate; 1,3-butylene diisocyanate; 1,3,5-benzene triisocyanate; polymethylene polyphenylisocyanate; the liquid reaction products of (1) diisocyanates and (2) polyols or polyamines, and the like. In addition, mixtures of isocyanates may be employed, as well as the many impure or crude polyisocyanates that are commercially available such as crude mixtures of methylene bis(4-phenylisocyanate).

Any foaming agent commonly used in the art can be employed. Suitable foaming agents are those materials capable of liberating gaseous products when heated, or when reacted with an isocyanate. The preferred foaming agents are the fluorochlorocarbons boiling in the range of twenty to fifty degrees centigrade, and mixtures thereof, for example, trichlorofluoromethane, trichlorotrifluoroethane, dichloromonofluoromethane, monochloroethane, monochloromonofluoroethane, difluoromonochloroethane, difluorodichloroethane. Other foaming agents which can be employed include water, a tertiary alcohol and a concentrated acid such as is disclosed and claimed in U.S. 2,865,869, polymethylol phenols, dimethylol ureas, polycarboxylic compounds, and formic acid. Mixtures of any of the above foaming agents may also be used. The amounts of foaming agent used is not critical, but will be dictated by the type of foam desired. If a very dense foam is desired, only a small amount need be used. If a very light foam is desired, a maximum amount should be used. The amount used will also depend upon the particular foaming agent.

The catalyst employed can be any of the known conventional catalysts for the isocyanate reaction, such as tertiary amines, for example, triethylamine, N-methyl morpholine, triethanolamine, and the like, or antimony compounds such as antimony caprylate, antimony naphthenate or antimonous chloride. In addition, tin compounds may be employed such as dibutyltin dilaurate, tri-n-octyltin oxide, hexabutylditin, tributyltin phosphate or stannic chloride.

In the preparation of the polyurethane foams of the present invention it is preferred to blend the resinous reaction product of the present invention with a hydroxyl-containing polymer having a hydroxyl number of between 25 and 900. The resultant product is reacted with an organic polyisocyanate in the presence of a foaming agent and optionally a reaction catalyst, as above. The total resinous ingredients, that is the total of the resinous reaction product plus hydroxyl-containing polymer, should contain at least 20 percent by weight of resinous reaction product. It has been found in accordance with the present invention that by blending the resinous reaction product of the present invention with a hydroxyl-containing polymer, a wide variety of properties can be obtained in the resultant polyurethane foam, depending upon the particular hydroxyl-containing polymer employed and the proportion of hydroxyl-containing polymer to resinous reaction product.

Rigid or flexible polyurethane foams are thereby obtained. The rigid polyurethane foams utilize a highly branched hydroxyl rich polyester or polyether having a hydroxyl number of between about 200 and 900. The flexible polyurethane foams utilize a linear relatively hydroxyl poor polyester or polyether having a hydroxyl number of between about 25 and 100. If a polyester or polyether with a hydroxyl number between 100 and 200 is employed, a semi-rigid polyurethane foam is obtained.

Any hydroxyl-containing polymer having a hydroxyl number of between about 25 and 900 can be used in the present invention, for example a polyester, a polyether or mixtures thereof.

The polyesters are the reaction products of a polyhydric alcohol and a polycarboxylic compound, said polycarboxylic compound being either a polycarboxylic acid, a polycarboxylic acid anhydride, a polycarboxylic acid ester, a polycarboxylic acid halide or mixtures thereof. Among the polycarboxylic compounds which can be used to form the polyester are: maleic acid; fumaric acid; phthalic acid; tetrachlorophthalic acid; and aliphatic acids such as oxalic, malonic, succinic, glutaric; adipic, and the like. Additional polycarboxylic compounds which may be used to form the polyester are Diels-Alder adducts of hexahalocyclopentadiene and a polycarboxylic compound, wherein the halogen is selected from the group consisting of chlorine, bromine, fluorine and mixtures thereof, for example: 1,4,5,6,7,7 - hexachlorobicyclo - (2.2.1) - 5 - heptene - 2,3-dicarboxylic acid; 1,4,5,6-tetrachloro-7,7-difluorobicyclo-(2.2.1)-5-heptene-2,3-dicarboxylic acid; 1,4,5,6,7,7-hexabromobicyclo-(2.2.1)-5-heptene-2,3-dicarboxylic acid; 1,4,5,6 - tetrabromo-7,7-difluorobicyclo-(2.2.1)-5-heptene-2,3-dicarboxylic acid; and the like. Mixtures of any of the above polycarboxylic compounds can be employed.

To obtain a satisfactory rigid foam, at least a portion of the total polyhydric alcohol component should be a polyhydric alcohol containing at least three hydroxyl groups. This condition provides a means for branching the polyester. Where an even more rigid structure is desired, the whole alcohol component can be made up of a trifunctional alcohol such as glycerol. Where a less rigid final product is desired, a difunctional polyhydric alcohol such as ethylene glycol or 1,4-butanediol can be utilized as that part of the polyhydric alcohol component. Other glycols such as diethylene glycol, propylene glycol, and the like can also be used. Among the polyhydric alcohols which can be used are glycerol, hexanetriol, butanetriol, trimethylol propane, trimethylol ethane, pentaerythritol, and the like. The ratio of the polyhydric alcohol such as glycerol to the polybasic acid can be expressed as the hydroxyl-carboxyl ratio, which may be defined as the number of moles of hydroxyl groups to the number of moles of carboxyl groups in a given weight of resin. This ratio may be varied over a wide range. Generally, however, a hydroxyl-carboxyl ratio of between 1.5:1 to 5:1 is employed.

Instead of employing a polycarboxylic compound which is Diels-Alder adduct of hexahalocyclopentadiene and a polycarboxylic compound, we may employ a polyhydric alcohol which is a Diels-Alder adduct of hexahalocyclopentadiene and a polyhydric alcohol. This can be done by employing (A) a polyester resin comprised of the reaction product of (1) an adduct of hexahalocyclopentadiene and a polyhydric alcohol containing aliphatic carbon-to-carbon unsaturation, (2) a polycarboxylic compound and (3) a polyhydric alcohol containing at least three hydroxyl groups. Typical adducts include: 2,3-dimethylol - 1,4,5,6,7,7 - hexachlorobicyclo - (2.2.1) - 5-heptene; 2,3 - dimethylol - 1,4,5,6 - tetrachloro - 7,7 - difluorobicyclo-(2.2.1)-5-heptene; and the like. These compounds and others are disclosed in the copending application Serial Number 308,922, for "Polyhalogen-Containing Polyhydric Compounds" filed September 10, 1952, now U.S. Patent Number 3,007,958.

Where aromatic or bicyclo carboxylic compounds are used, it is often desirable to incorporate aliphatic acids as part of the polyester resin. Suitable acids are adipic, oxalic, succinic, suberic, azelaic, and the like. Unsaturated acids such as maleic, fumaric, itaconic, citraconic, and aconitic can also be used.

The preferred polyesters of the present invention are those which contain an adduct of hexahalocyclopentadiene co-reacted in the polyester portion in view of the fact that they contain a large amount of stable chlorine, thereby enhancing the flame-retardant characteristics of the resultant foam. Particularly preferred are those polyesters wherein the adduct is reacted in the polycarboxylic portion of the polyester, due to lower cost and commercial availability of the polycarboxylic adducts of hexahalocyclopentadiene.

The polyethers employed are the reaction products of (1) either a polyhydric alcohol, a polycarboxylic acid, or a polyphenolic compound, and (2) a monomeric 1,2-epoxide possessing a single 1,2-epoxy group, such as, for example, propylene oxide. The polyhydric alcohols, polycarboxylic acids, and epoxides which can be employed are any of the polyhydric alcohols, polycarboxylic acids and monomeric 1,2-epoxides having a single, 1,2-epoxy group, hereinbefore listed. Suitable polyphenolic compounds are the phenol-aldehyde resins such as phenol-formaldehyde novolac resins.

The fire-resistant surface coatings prepared from the reaction products of the present invention are prepared by reacting the reaction products of the present invention with low molecular weight polyesters or polyethers in the presence of an inert solvent. Alternatively, fire-resistant surface coatings can be obtained by reacting the reaction products of the present invention with liquid hydroxyl containing glycerides in the presence of an inert solvent. In each case, appropriate reaction catalysts may be employed if desired.

Fire-resistant elastomers or synthetic rubbers can be obtained by reacting the reaction products of the present invention with a linear polyester or polyether, preferably in the presence of a reaction catalyst. The resultant product is then milled, and the like, by procedures known to the art. Optionally, fillers and modifying agents such as are known to the art are employed.

Fire-resistant adhesives can also be obtained in the conventional manner. A solvent can be employed, if desired, and the adhesives are preferably prepared in the presence of a reaction catalyst.

The following examples serve to illustrate the invention, but do not limit it. All parts are by weight and temperatures in degrees centigrade unless specified otherwise.

EXAMPLE 1

*Preparation of resinous material*

To a one-liter, three-necked flask equipped with a mechanical stirrer, thermometer, and reflux condenser and containing 348.5 grams (six moles) of propylene oxide is added 389 grams (one mole) of chlorendic acid with stirring. The acid rapidly dissolves in the propylene oxide with an evolution of heat. The potassium hydroxide (0.04–1.0 gram) was then added to the reaction and mixture refluxed for eighteen hours. At the end of this time, the acid number of the product was zero. The excess propylene oxide was then distilled off under vacuum. The residual product was a honey-colored liquid with a zero acid number, hydroxyl number of 202, and a chlorine content of 34.3 percent. This is equivalent of about four moles of propylene oxide reacting with each mole of 1,4,5,6,7,7 - hexachlorobicyclo-(2.2.1) - 5-heptene-2,3-dicarboxylic acid.

EXAMPLE 2

*Preparation of rigid polyurethane foam*

A resin having a hydroxyl number of 365 was first prepared by adding twelve moles of trimethylolpropane to a flask containing six moles of chlorendic acid and cooking the mixture at 160 degrees centigrade under a stream of nitrogen to a zero acid number during which time the water of reaction was removed by distillation. Then 113 grams of this resin was added to a beaker together with 73.5 grams of the reaction product of Example 1, and 0.28 gram of dibutyl tin dilaurate. The mixture was then stirred and heated to 39 degrees centigrade. At this point, a solution of 16.5 grams of trichlorofluoromethane dissolved in 100 grams of the reaction product of 593 grams of chlorendic acid and 1392 grams of tolylene diisocyanate isomers, which consisted of a commercial mixture of eighty percent 2,4-tolylene diisocyanate and twenty percent 2,6-diisocyanate, was added and the mixture stirred thoroughly for two and one-half minutes during which time it changed to a creamy mass. The creamy mixture was poured into a mold, allowed to expand for a few minutes, then cured at 120 degrees centigrade for one hour. The product was a rigid, fire-resistant foam with a density of four pounds per cubic foot and a fine cell structure.

EXAMPLE 3

*Preparation of semi-rigid polyurethane foam*

The following ingredients were blended at room temperature: 150 grams of polyether which had a hydroxyl number of 42 and which was the reaction product of one mole of trimethylolpropane and 67 moles of propylene oxide; eight grams of water; two grams of silicone oil; and two grams of triethylenediamine. To this solution was added with rapid stirring 200 grams of a semi-prepolymer which was the reaction product of 55 parts of tolylene diisocyanate isomers and 45 parts of the liquid resinous reaction product of one mole of chlorendic acid, and four moles of propylene oxide, said liquid resinous reaction product prepared in the manner of Example 1, and having a hydroxyl number of 170. The foam was permitted to expand at room temperature, then cured for one hour at 120 degrees centigrade. The final foam had a density of 22 lb./ft.$^3$, had slow recovery after compression and was self-extinguishing.

EXAMPLE 4

*Preparation of flexible polyurethane foam*

The following ingredients were blended at room temperature: 330 grams of polyether which had a hydroxyl number of 42 and which was the reaction product of one mole of trimethylolpropane and 67 moles of propylene oxide; nine grams of water; 2.5 grams of silicone oil; and 3.0 grams of triethylenediamine. To this solution was added with rapid stirring: 220 grams of a semi-prepolymer which was the reaction product of 64 parts tolylene diisocyanate isomers, and 36 parts of the liquid resinous reaction product of one mole of chlorendic acid, and four moles of propylene oxide, said liquid resinous reaction product prepared in the manner of Example 1, and having a hydroxyl number of 170. The foam was permitted to expand at room temperature, cured for five minutes at 120 degrees centigrade, crushed, then cured for one hour at 120 degrees centigrade. The final foam had a density of 2.5 lb./ft.$^3$, was resilient and self-extinguishing, and in addition, the melt was self-extinguishing.

EXAMPLE 5

*Preparation of rigid polyurethane foam*

The following ingredients were blended at room temperature: 70 grams of the liquid resinous reaction product of one mole of chlorendic acid, and four moles of propylene oxide, said liquid resinous reaction product prepared in the manner of Example 1, and having a hydroxyl number of 170; thirty grams of trimethylolpropane; 0.5 gram of silicone oil; and 1.0 gram of N,N,N′,N′-tetramethyl-1,3-butanediamine. To this solution was added with rapid stirring a solution of: 127 grams of semi-prepolymer which was the reaction product of 70 parts tolylene diisocyanate isomers and 30 parts of the liquid resinous reaction product of one mole of chlorendic acid and four moles of propylene oxide, said liquid resinous reaction product prepared in the manner of Example 1, and having a hydroxyl number of 170; and 30 grams of trichlorofluoromethane. The foam was permitted to expand at room temperature, then was cured at 80 degrees centigrade for fifteen minutes. The final foam had a density of 2.6 lb./ft.$^3$, and was self-extinguishing.

EXAMPLE 6

*Preparation of semi-rigid polyurethane foam*

The following ingredients were blended at room temperature: 100 grams of polyester which was the liquid resinous reaction product of one mole of chlorendic acid, and four moles of propylene oxide, said liquid resinous reaction product prepared in the manner of Example 1, and having a hydroxyl number of 170; four grams of water; one gram of silicone oil; and one gram of triethylenediamine. To this was added with rapid stirring: 170 grams of semi-prepolymer which was the reaction product of 70 parts of tolylene diisocyanate isomers, and 30 parts of the liquid resinous reaction product of chlorendic acid, and four moles of propylene oxide, said liquid resinous reaction product prepared in the manner of Example 1, and having a hydroxyl number of 170. The foam was permitted to expand at room temperature, then cured at 80 degrees centigrade for one hour. The final foam had a density of 2.8 lb./ft.$^3$, and was self-extinguishing.

EXAMPLE 7

The process of the invention was carried out under pressure in a pressure reactor of 1000 ml. capacity, equipped with a stirrer, heating jacket and a Mercoid pressure controller. Initially, 2 moles of propylene oxide were reacted with 0.5 mole of chlorendic acid in the presence of 0.3 weight percent stannous octoate based on the weight of chlorendic acid. The reaction commenced without heating and was exothermic, accompanied by a rise in pressure. As the exotherm subsided and the pressure dropped due to the propylene oxide being consumed, the mixture was heated to 100–110 degrees centigrade. Then, the Mercoid controller, sensing pressure, with variable on-off set points, was adjusted to maintain a control band of 20–40 pounds per square inch gauge. When the pressure dropped below 20 p.s.i.g., as a result of propylene oxide consumption, the Mercoid switch closed and the addition pump was activated. Propylene oxide was then pumped into the reactor through a line protected by a check valve until the reactor pressure was 40 p.s.i.g. At this point the Mercoid switch opened, shutting off the propylene oxide addition pump. In this manner the addition cycle was automatically repeated until an additional 2.7 moles of propylene oxide were added (and reacted). The addition was then stopped, the reaction mixture transferred to a rotating vacuum evaporator to remove traces of unreacted propylene oxide. The final product was a resinous material with a hydroxyl number of 121. The molecular weight calculated from hydroxyl number was 928. The chlorine analysis showed 21.6 percent chlorine. The viscosity of this material was 3,700 centipoises at 30 degrees centigrade and the Gardner color value was 3. The product contained 9.3 moles of propylene oxide per mole of chlorendic acid.

EXAMPLES 8 TO 11

Using the same procedure set forth in Example 7, additional resinous products of the invention were prepared in which the ratios of alkylene oxide to chlorendic acid were varied. The properties of the resulting compositions are tabulated in Table 1.

TABLE I

| | Example Number | | | |
|---|---|---|---|---|
| | 8 | 9 | 10 | 11 |
| Moles Alkylene Oxide per mole Chlorendic Acid | 5.7 | 6.4 | 7.4 | 8.05 |
| Hydroxyl No. (mg. KOH/g.) | 156 | 143 | 137 | 131 |
| Acid No. (mg. KOH/g.) | 0.4 | 0.3 | 0.5 | 0.6 |
| Chlorine Content, Wt. Percent | 27.1 | 27.0 | 24.2 | 22.4 |
| Molecular weight | 719 | 758 | 819 | 856 |
| Viscosity, centipoises at 30° C | 15,400 | 14,000 | 6,200 | 4,200 |
| Color, Gardner scale | 2 | 5 | 3 | 3 |

This invention can be embodied in other forms or carried out in other ways without departing from the spirit or essential characteristics thereof. The present embodiment is therefore to be considered as in all respects illustrative and not restrictive, and all changes which come within the meaning and range of equivalency are intended to be embraced therein.

We claim:

1. A composition having the formula:

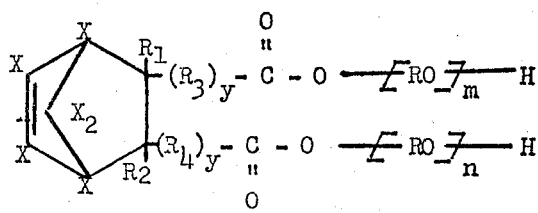

wherein X is a halogen selected from the group consisting of fluorine, chlorine, bromine, and mixtures thereof; R is a residue of a monomeric 1,2-epoxide containing no more than 18 carbon atoms; $R_1$ and $R_2$ are selected from the group consisting of hydrogen and alkyl radicals having 1 to 4 carbon atoms; $R_3$ and $R_4$ are hydrocarbon radicals having 1 to 6 carbon atoms; $y$ is an integer from 0 to 1; and $m$ and $n$ are integers from 1 to 10; wherein $m+n$ is at least 4.

2. A composition having the formula:

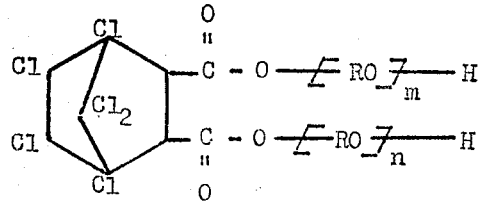

wherein R is a residue of a monomeric 1,2-epoxide containing no more than 18 carbon atoms, and $m$ and $n$ are integers from 1 to 10, wherein $m+n$ is at least 4.

3. The composition of claim 2 wherein the monomeric 1,2-epoxide is an alkylene oxide having 2 to 6 carbon atoms.

4. The composition of claim 3 wherein the alkylene oxide is propylene oxide.

References Cited by the Examiner

UNITED STATES PATENTS

| 2,779,701 | 1/1957 | Robitschek | 260—468 |
| 2,779,783 | 1/1957 | Hayes | 260—485 |
| 2,865,869 | 12/1958 | Hindersinn et al. | 260—2.5 |
| 2,906,717 | 9/1959 | Sekmakas | 260—2.5 |
| 3,007,958 | 11/1961 | Robitschek et al. | 260—468 |
| 3,081,334 | 4/1963 | Kauer et al. | 260—468 |
| 3,098,047 | 7/1963 | Tapas et al. | 260—2.5 |
| 3,101,374 | 8/1963 | Patton | 260—485 |

LORRAINE A. WEINBERGER, *Primary Examiner.*

DONALD E. CZAJA, *Examiner.*

R. K. JACKSON, *Assistant Examiner.*